(12) United States Patent
Utsunomiya

(10) Patent No.: US 11,011,979 B2
(45) Date of Patent: May 18, 2021

(54) BOOSTER CIRCUIT

(71) Applicant: ABLIC Inc., Tokyo (JP)

(72) Inventor: Fumiyasu Utsunomiya, Tokyo (JP)

(73) Assignee: ABLIC INC., Tokyo (JP)

( * ) Notice: Subject to any disclaimer, the term of this patent is extended or adjusted under 35 U.S.C. 154(b) by 0 days.

(21) Appl. No.: 16/930,983

(22) Filed: Jul. 16, 2020

(65) Prior Publication Data
US 2021/0036606 A1 Feb. 4, 2021

(30) Foreign Application Priority Data

Aug. 2, 2019 (JP) .............................. JP2019-142738
Apr. 15, 2020 (JP) .............................. JP2020-072887

(51) Int. Cl.
*H02M 3/07* (2006.01)
(52) U.S. Cl.
CPC ..................................... *H02M 3/07* (2013.01)
(58) Field of Classification Search
CPC ............. H02M 3/07; H02M 2003/071; H02M 2003/072
See application file for complete search history.

(56) References Cited

U.S. PATENT DOCUMENTS

2002/0034082 A1* 3/2002 Yokomizo ............... H02M 3/07
363/16

FOREIGN PATENT DOCUMENTS

JP 2001-183620 A 7/2001

* cited by examiner

*Primary Examiner* — Diana J. Cheng
(74) *Attorney, Agent, or Firm* — Brinks Gilson & Lione

(57) ABSTRACT

Provided is a booster circuit capable of adjusting a power conversion capacity in accordance with input power and also of stably performing a boost operation. The booster circuit includes a first voltage detection circuit configured to output as a first control signal a result of comparing an input voltage and a first voltage obtained by dividing an output voltage, a first oscillation circuit configured to be controlled to operate based on the first control signal, and a first switched-capacitor booster circuit configured to operate in accordance with a first clock signal provided from the first oscillation circuit.

2 Claims, 2 Drawing Sheets

BOOSTER CIRCUIT

RELATED APPLICATIONS

This application claims priority to Japanese Patent Application No. 2019-142738, filed on Aug. 2, 2019, and Japanese Application No. 2020-072887, filed on Apr. 15, 2020, the entire contents of which are incorporated herein by reference.

BACKGROUND OF THE INVENTION

1. Field of the Invention

The present invention relates to a booster circuit.

2. Description of the Related Art

FIG. 4 is a circuit diagram for illustrating a booster circuit 400 serving as a conventional booster circuit.

The booster circuit 400 includes an oscillation circuit 401, a PMOS transistor 402, an NMOS transistor 403, diodes 404 and 406, and a capacitor 405. The booster circuit 400 includes an input terminal and an output terminal.

The booster circuit 400 switchingly turns on or off the PMOS transistor 402 and the NMOS transistor 403 in accordance with a clock signal supplied from the oscillation circuit 401, to thereby boost an input voltage. A solar battery 101 is connected to the input terminal of the booster circuit 400. A secondary battery 112 is connected to the output terminal of the booster circuit 400.

Thus, the booster circuit 400 receives a power generated by the solar battery 101 from the input terminal, and boosts about two-fold an input voltage VIN applied from the input terminal of the booster circuit 400, to thereby obtain a voltage VB. The obtained voltage VB is supplied from the output terminal of the booster circuit 400 to a secondary battery 112 (for example, see Japanese Patent Application Laid-open No. 2001-183620).

However, in the conventional booster circuit, the oscillation circuit outputs a constant frequency, and hence a power conversion capacity of the conventional booster circuit is invariable. Thus, it is not considered to adjust the power conversion capacity in accordance with power generated by the solar battery or other power sources. Further, in the conventional booster circuit, an input voltage cannot always be boosted two-fold due to voltage loss caused by the diodes.

SUMMARY OF THE INVENTION

The present invention has been made to consider the above-described circumstance, and therefore has an object to provide a booster circuit capable of adjusting a power conversion capacity in accordance with input power and also of stably performing a boost operation.

According to at least one embodiment of the present invention, there is provided a booster circuit, including a first voltage detection circuit configured to output as a first control signal a result of comparing an input voltage and a first voltage obtained by dividing an output voltage; a first oscillation circuit configured to be controlled to operate based on the first control signal; and a first switched-capacitor booster circuit configured to operate in accordance with a first clock signal provided from the first oscillation circuit.

According to at least one embodiment of the present invention, the booster circuit is configured such that the first oscillation circuit operates in accordance with the first control signal of the first voltage detection circuit. Thus, it is possible to efficiently boost the voltage regardless of a high input power or a low input power.

DETAILED DESCRIPTION OF THE PREFERRED EMBODIMENTS

Figure 1:
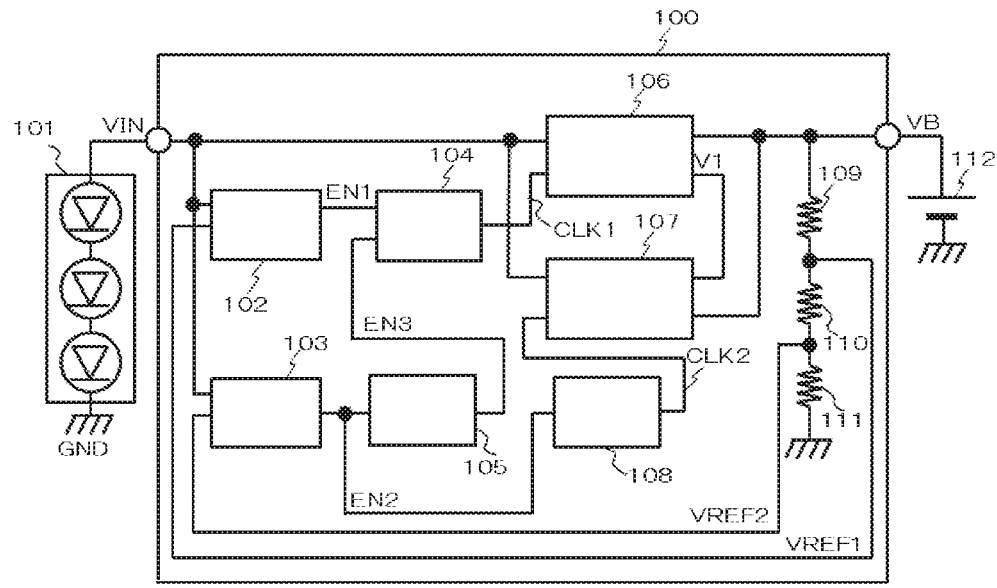
FIG. 1 is a block diagram for illustrating a booster circuit according to at least one embodiment of the present invention.

FIG. 1 is a block diagram for illustrating a booster circuit 100 according to at least one embodiment of the present invention.

The booster circuit 100 is configured to boost an input voltage supplied from an input terminal thereof to twice the input voltage, and to output the boosted input voltage from an output terminal thereof. The input terminal of the booster circuit 100 is connected to a voltage source such as a solar battery 101. The output of the booster circuit 100 is connected to a secondary battery 112. The booster circuit 100 receives an input voltage VIN via the input terminal of the booster circuit 100, and supplies the voltage VB to a secondary battery 112 via the output terminal of the booster circuit 100. The input voltage VIN corresponds to an output voltage of the solar battery 101. The voltage VB corresponds to a boosted voltage based upon the input voltage VIN. In the following description of this embodiment, it is assumed that the input voltage VIN is an output voltage of a 1.5-V solar battery, and the voltage VB is 3.0 V. Regarding the 1.5-V solar battery having a three-cell configuration, its output voltage in an operating state is about 1.5 V, and its open-circuit voltage in a no-load state is about 1.8 V.

The booster circuit 100 includes, e.g., first and second voltage detection circuits 102 and 103, first and second oscillation circuits 104 and 108, a delay circuit 105, first and second switched-capacitor booster circuits 106 and 107, and resistors 109, 110, and 111 constituting a voltage divider circuit.

The first voltage detection circuit 102 receives the input voltage VIN and a first voltage VREF1, and supplies a first control signal EN1 corresponding to a result of comparing those voltages. The first voltage VREF1 is supplied from the voltage divider circuit, and is set to, for example, a voltage obtained by adding about 0.1 V to ½ of the voltage VB, i.e., the voltage of the secondary battery 112. The first control signal EN1 is a signal to control the first oscillation circuit 104, That is, the first control signal EN1 is a signal to operate the first oscillation circuit 104 if the input voltage VIN is higher than the first voltage VREF1, and to stop the first oscillation circuit 104 if the input voltage TIN is equal to or less than the first voltage VREF1.

The second voltage detection circuit 103 receives the input voltage YIN and a second voltage VREF2, and supplies a second control signal EN2 corresponding to a result of comparing those voltages. The second voltage VREF2 is supplied from the voltage divider circuit, and is set to be lower than the first voltage VREF1. The second control signal EN2 is a signal to control the second oscillation circuit 108. That is, the second control signal EN2 is a signal to operate the second oscillation circuit 108 if the input voltage YIN is higher than the second voltage VREF2, and to stop the second oscillation circuit 108 if the input voltage VIN is equal to or less than the second voltage VREF2. Further, the second control signal EN2 is provided as a third control signal EN3 to the first oscillation circuit 104 via the delay circuit 105. Hence, the first oscillation circuit 104 is configured to always start operating with some delay from the second oscillation circuit 108 in accordance with the third control signal EN3. The third control signal EN3 is a signal to operate the first oscillation circuit 104 if the input voltage YIN is higher than the second voltage VREF2, and to stop the first oscillation circuit 104 if the input voltage VIN is equal to or less than the second voltage VREF2, The first oscillation circuit 104 is further configured to operate if the first and the third control signals EN1 and EN3 are each signal to operate the first oscillation circuit 104.

The first oscillation circuit 104 is controlled by the first control signal EN1 and the third control signal EN3, and thereby supplies a clock signal CLK1 serving as a first clock signal to the first switched-capacitor booster circuit 106. The first switched-capacitor booster circuit 106 supplies the voltage VB obtained by boosting the input voltage VIN two-fold, in accordance with the clock signal CLK1. Further, the first switched-capacitor booster circuit 106 receives a boosted voltage V1 supplied from the second switched-capacitor booster circuit 107 as described below.

The second oscillation circuit 108 is controlled by the second control signal EN2, and thereby supplies a clock signal CLK2 serving as a second clock signal to the second switched-capacitor booster circuit 107. The second switched-capacitor booster circuit 107 supplies the boosted voltage V1 higher than the voltage VB to the first switched-capacitor booster circuit 106, in accordance with the clock signal CLK2.

Figure 2:
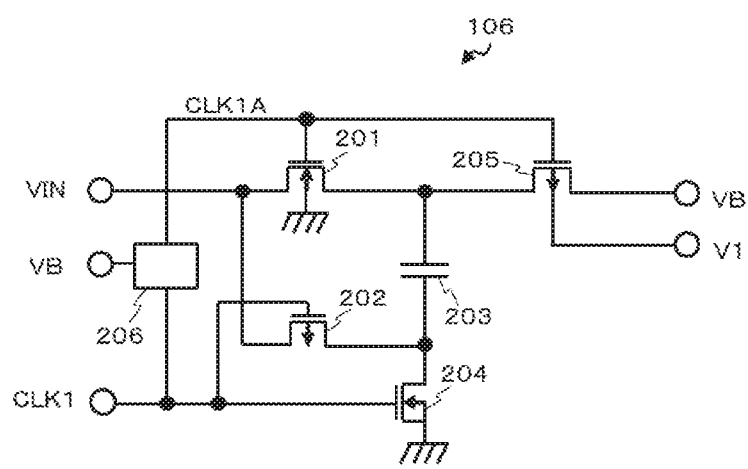
FIG. 2 is a circuit diagram for illustrating a first switched-capacitor booster circuit of the booster circuit according to the embodiment of the present invention.

FIG. 2 is a circuit diagram for illustrating the first switched-capacitor booster circuit 106.

The first switched-capacitor booster circuit 106 includes a backflow-prevention NMOS transistor 201, a backflow-prevention PMOS transistor 205, a switching PMOS transistor 202, a switching NMOS transistor 204, a boost capacitor 203, and a level shift circuit 206. A drain of the NMOS transistor 201 is connected to a drain of the PMOS transistor 205.

The first switched-capacitor booster circuit 106 employs the backflow-prevention NMOS transistor 201, the backflow-prevention PMOS transistor 205, to thereby decrease voltage loss caused by the boost operation. In this example, there may be a case where a drain voltage of the PMOS transistor 205 exceeds a substrate voltage. In this case, a parasitic bipolar transistor is turned on, to thereby cause latch-up. Thus, the PMOS transistor 205 is configured such that the boosted voltage V1 higher than the voltage VB is applied to the substrate of the PMOS transistor 205, and hence the parasitic bipolar transistor is not turned on, that is, latch-up is avoided.

Here, the clock signal CLK1 is a signal at the level of the input voltage VIN, and a clock signal CLK1A is a signal at the level of the voltage VB. The clock signal CLK1A is obtained through level shifting of the voltage by the voltage level shift circuit 206 for which the voltage VB of the secondary battery 112 is used as a power supply.

Figure 3:
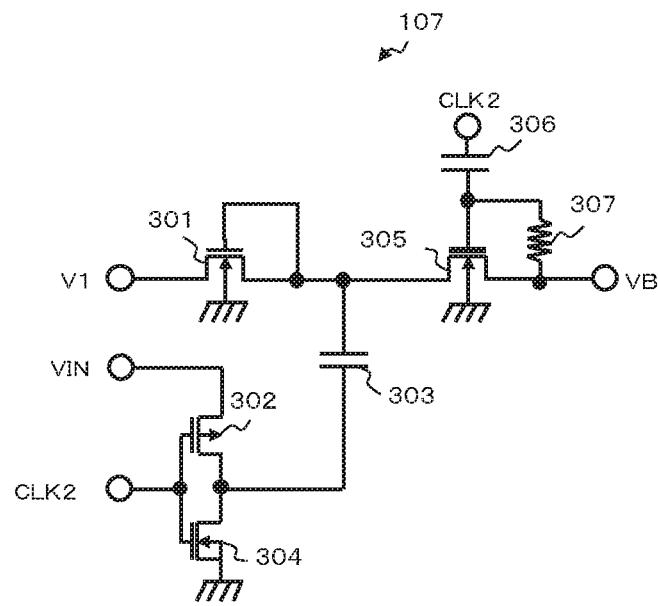
FIG. 3 is a circuit diagram for illustrating a second switched-capacitor booster circuit of the booster circuit according to the embodiment of the present invention.
Figure 4:
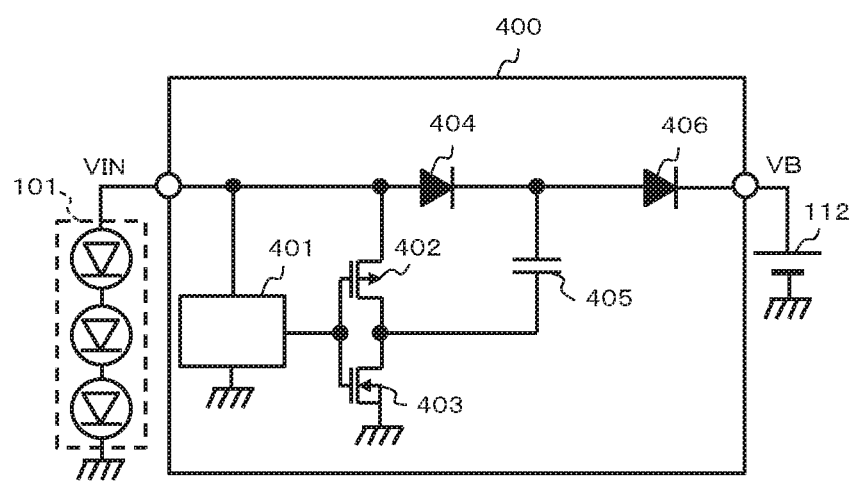
FIG. 4 is a circuit diagram for illustrating a conventional booster circuit.

FIG. 3 is a circuit diagram for illustrating the second switched-capacitor booster circuit 107.

The second switched-capacitor booster circuit 107 includes a backflow-prevention NMOS transistor 301, a backflow-prevention depletion-type NMOS transistor 305, a switching PMOS transistor 302, a switching NMOS transistor 304, a boost capacitor 303, a coupling capacitor 306, and a resistor 307.

In the second switched-capacitor booster circuit 107, the capacitor 303 charged up to the voltage VB is series-connected to the input voltage VIN, to thereby output the boosted voltage V1 higher than the voltage VB. As a charge control switch for the capacitor 303, the depletion-type NMOS transistor 305 is used. The NMOS transistor 305 has a gate which is biased to the voltage VB via the resistor 307, and receives the clock signal CLK2 via the capacitor 306. Here, the clock signal CLK2 is a signal at the level of the input voltage VIN. With this configuration, the second switched-capacitor booster circuit 107 can output the boosted voltage V1 higher than the voltage VB. The boosted voltage V1 is a voltage obtained by subtracting a threshold voltage of the NMOS transistor 301 from a result of adding the voltage VB being 3 V and the input voltage VIN being 1.5 V.

Next, an operation of the booster circuit 100 configured as described above is described.

When the first switched-capacitor booster circuit 106 is in such a state that the boost capacitor 203 is being charged, the NMOS transistor 201 and the NMOS transistor 204 are turned on, and the PMOS transistor 202 and the PMOS transistor 205 are turned off. In this state, the input voltage VIN becomes equal to or less than the first voltage VREF1. Thus, the first voltage detection circuit 102 outputs the first control signal EN1 to stop the first oscillation circuit 104.

If the capacitor 203 is charged, and then the input voltage VIN becomes higher than the first voltage VREF1, the first voltage detection circuit 102 outputs the first control signal EN1 to operate the first oscillation circuit 104. The first oscillation circuit 104 receives the first control signal EN1 to operate the first oscillation circuit 104, and thereby operates to supply the clock signal CLK1 to the first switched-capacitor booster circuit 106. In the first switched-capacitor booster circuit 106, the NMOS transistor 201 and the NMOS transistor 204 are turned off and the PMOS transistor 202 and the PMOS transistor 205 are turned on, and hence the first switched-capacitor booster circuit 106 supplies the voltage VB to the secondary battery 112. Further, when the level of the clock signal CLK1 is inverted, the NMOS transistor 201 and the NMOS transistor 204 are turned on, and the PMOS transistor 202 and the PMOS transistor 205 are turned off. Then, the capacitor 203 makes a transition to a charged state, and the input voltage VIN becomes equal to or less than the first voltage VREF1. Thus, the first voltage detection circuit 102 supplies the first control signal EN1 to stop the first oscillation circuit 104.

The first switched-capacitor booster circuit 106 repeats the above-described operation, and hence the booster circuit 100 boosts the input voltage VIN being 1.5 V up to the voltage VB being 3.0 V, and supplies the resultant voltage from the output terminal thereof to the secondary battery 112.

The booster circuit 100 includes the first switched-capacitor booster circuit 106 configured as described above, and can therefore adjust a charging period of the capacitor 203. If power generated by the solar battery 101 is large, a charging period of the capacitor 203 is shortened, and hence a switching frequency of the first switched-capacitor booster circuit 106 is increased. Thus, the booster circuit 100 enables the first oscillation circuit 104 to decrease an operation period, and can thereby suppress to dissipate (lose) the power generated by the solar battery 101. That is, the booster circuit 100 can effectively boost the power generated by the solar battery 101. If power generated by the solar battery 101 is small, the charging period of the capacitor 203 is increased. However, during this period, the first oscillation circuit 104 is stopped, and hence the booster circuit 100 is in a state of low current consumption. Thus, there is no fear about wasteful consumption of the power generated by the solar battery 101.

Further, the second oscillation circuit 108 starts operating in accordance with the second control signal EN2 corresponding to a result of comparing the input voltage VIN and the second voltage VREF2. Thus, the second switched-capacitor booster circuit 107 can supply the boosted voltage V1 before the first switched-capacitor booster circuit 106 starts operating. Further, the second control signal EN2 is provided as the third control signal EN3 to the first oscillation circuit 104 via the delay circuit 105, and hence the second switched-capacitor booster circuit 107 can supply the boosted voltage V1 before the first switched-capacitor booster circuit 106 starts operating. That is, the parasitic bipolar transistor of the first switched-capacitor booster circuit 106 is not turned on, and thus latch-up can be avoided.

As described above, the booster circuit 100 is configured such that the first oscillation circuit 104 operates in accordance with the control signal of the first voltage detection circuit 102. That is, the booster circuit according to at least one embodiment of the present invention is configured such that the first oscillation circuit operates in accordance with the first control signal of the first voltage detection circuit. Thus, it is possible to efficiently boost the voltage regardless of a high input power or a low input power. That is, the 3-V secondary battery can be efficiently charged with the power generated by the 1.5-V solar battery. Further, the PMOS transistor 205 provided for backflow prevention is configured such that a voltage higher than the voltage VB is applied to the substrate thereof, and hence the voltage VB is stably obtained by boosting the input voltage VIN. In the above-described booster circuit 100, stable two-fold boosting can be ensured without causing latch-up.

The embodiment of the present invention has been described above, but the present invention is not limited to the above-described embodiment, and it is understood that various modifications can be made thereto without departing from the gist of the present invention. For example, the booster circuit 100 is not limited to the booster circuit illustrated in FIG. 1, and may omit at least one circuit selected from a group consisting of the second voltage detection circuit 103, the delay circuit 105, the second switched-capacitor booster circuit 107, the second oscillation circuit 108, and the voltage divider circuit from the booster circuit illustrated in FIG. 1. That is, the booster circuit 100 may include at least one circuit selected from the group in addition to the first voltage detection circuit 102, the first oscillation circuit 104, and the first switched-capacitor booster circuit 106.

What is claimed is:

1. A booster circuit, comprising:
an input terminal to which an input voltage is applied;
an output terminal from which an output voltage is output;
a first voltage detection circuit configured to output as a first control signal a result of comparing the input voltage and a first voltage obtained by dividing the output voltage;
a first oscillation circuit configured to be controlled to operate based on the first control signal; and
a first switched-capacitor booster circuit which includes an input port connected to the input terminal and an output port connected to the output terminal and is configured to operate in accordance with a first clock signal supplied from the first oscillation circuit.

2. The booster circuit according to claim 1, further comprising:
a second voltage detection circuit configured to output as a second control signal a result of comparing the input voltage and a second voltage obtained by dividing the output voltage, the second voltage being lower than the first voltage;
a second oscillation circuit configured to be controlled to operate based on the second control signal; and
a second switched-capacitor booster circuit configured to operate in accordance with a second clock signal supplied from the second oscillation circuit, wherein the second switched-capacitor booster circuit is configured to output a voltage higher than the output voltage to a substrate of a backflow-prevention PMOS transistor of the first switched-capacitor booster circuit.

* * * * *